United States Patent
Arbouzov

(10) Patent No.: US 10,162,056 B2
(45) Date of Patent: Dec. 25, 2018

(54) LASER RANGE FINDING ATTACHMENT FOR MOBILE COMPUTING DEVICE

(71) Applicant: Ivan Arbouzov, Irving, TX (US)

(72) Inventor: Ivan Arbouzov, Irving, TX (US)

( * ) Notice: Subject to any disclaimer, the term of this patent is extended or adjusted under 35 U.S.C. 154(b) by 925 days.

(21) Appl. No.: 14/192,222

(22) Filed: Feb. 27, 2014

(65) Prior Publication Data

US 2014/0240689 A1  Aug. 28, 2014

Related U.S. Application Data

(60) Provisional application No. 61/769,752, filed on Feb. 27, 2013.

(51) Int. Cl.
| | |
|---|---|
| *G01C 3/08* | (2006.01) |
| *G01S 17/08* | (2006.01) |
| *G01S 17/02* | (2006.01) |
| *G01S 7/481* | (2006.01) |
| *G01S 7/51* | (2006.01) |

(52) U.S. Cl.
CPC ............ *G01S 17/08* (2013.01); *G01S 7/4813* (2013.01); *G01S 7/4814* (2013.01); *G01S 7/4816* (2013.01); *G01S 7/51* (2013.01); *G01S 17/023* (2013.01)

(58) Field of Classification Search
CPC ...... G01S 17/08; G01S 7/4813; G01S 7/4814; G01S 7/4816; G01S 7/51; G01S 17/023
See application file for complete search history.

(56) References Cited

U.S. PATENT DOCUMENTS

| | | | | |
|---|---|---|---|---|
| 2007/0030348 A1* | 2/2007 | Snyder | ...................... | G01C 3/08 |
| | | | | 348/135 |
| 2009/0293012 A1* | 11/2009 | Alter | ...................... | G01C 21/20 |
| | | | | 715/810 |
| 2013/0271744 A1* | 10/2013 | Miller | ...................... | G01C 3/08 |
| | | | | 356/4.01 |

* cited by examiner

*Primary Examiner* — Samantha K Abraham
(74) *Attorney, Agent, or Firm* — Fish & Richardson P.C.

(57) ABSTRACT

The present disclosure describes methods and systems, including computer-implemented methods, computer-readable media, and computer systems, for measuring range to an object (e.g., range finding) by reflection of laser radiation. One computer-implemented method includes the following operations executed on a mobile computing device (MCD): targeting an object with the MCD display operating as a viewfinder, receiving a request to trigger a laser range finding operation, initiating triggering of an emitter on a laser range finding attachment (LRFA) coupled to the MCD, receiving range finding data from the LRFA, processing the range finding data, and initiating display of data associated with the object, the data corresponding to the processed range finding data.

20 Claims, 10 Drawing Sheets

LASER RANGE FINDING ATTACHMENT FOR MOBILE COMPUTING DEVICE

This application claims priority under 35 U.S.C. § 119(e) to U.S. Provisional patent application Ser. No. 61/769,752, filed on Feb. 27, 2013. The entire contents of U.S. Provisional Patent Application Ser. No. 61/769,752 are hereby incorporated by reference.

BACKGROUND

Laser range finders (LRFs) use received reflections of a ranging laser energy directed toward an object to calculate distance/range measurements from the LRF to the object targeted (e.g., range finding). Conventional LRFs, such as hand-held and tripod mounted systems, are typically self-contained devices designed to provide only laser range-finding and related functionality. Internal components of the LRF process and output range measurement information, and in some instances, run computer programs to customize the information delivered to a user. Processing power and available features of the conventional LRFs is typically limited by hardware (or the lack thereof) and/or software that may not be designed to run complex interactive programs. The inability to execute complex interactive programs and/or lack of available hardware, such as a large, color data display, digital camera, a global positioning system (GPS) receiver, an accelerometer, a gyroscopic sensor, compass, wireless radio, temperature/pressure sensor, altimeter, and/or other hardware limits the applicability of a conventional LRF for particular useful functions provides a cause for rejection of the LRF by potential users.

SUMMARY

The present disclosure relates to methods and systems, including computer-implemented methods, computer-readable media, and computer systems, for measuring range to an object (e.g., range finding) by reflection of laser radiation. One computer-implemented method includes the following operations executed on a mobile computing device (MCD): targeting an object with the MCD display operating as a viewfinder, receiving a request to trigger a laser range finding operation, initiating triggering of an emitter on a laser range finding attachment (LRFA) coupled to the MCD, receiving range finding data from the LRFA, processing the range finding data, and initiating display of data associated with the object, the data corresponding to the processed range finding data.

Other implementations of this aspect include corresponding systems configured to perform the actions of the method. One or more systems can be configured to perform particular actions of the method. The systems can include one or more computers configured to perform the particular operations or actions by virtue of having software, firmware, hardware, computer-readable media or a combination of software, firmware, hardware, or computer-readable media installed on the systems. One or more computer programs can be configured to perform particular operations or actions by virtue of including instructions that, when executed by a computer, cause the computer to perform the actions.

The foregoing and other implementations can each optionally include one or more of the following features, alone or in combination:

A first aspect, combinable with the general implementation, comprising receiving an indication from a user to initiate a laser range finding function on the MCD.

A second aspect, combinable with any of the previous aspects, wherein the display depicts a reticle for targeting the object.

A third aspect, combinable with any of the previous aspects, wherein the request is received by a graphical user interface associated with the MCD.

A fourth aspect, combinable with any of the previous aspects, wherein the data is at least one of a range measurement, global positioning system (GPS) related data, or ballistic solution.

The subject matter described in this specification can be implemented in particular implementations so as to realize one or more of the following advantages. First, a described laser range finder attachment (LRFA) provides extendable functionality (e.g., laser range finding) to a user's mobile computing device. As a user is typically familiar with their mobile computing device, the operation of the LRFA only requires minor learning and technical skill. Second, the LRFA can be securely attached to the mobile computing device but yet can be easily removed to allow the mobile computing device to be used in a normal manner. This also allows the LRFA to be securely stored or to be switched for a different LRFA with functionality useful/necessary for a particular need. Third, the LRFA can leverage hardware and/or software associated with a particular mobile computing device. For example, the LRFA can be used by a computer program, such as a mobile computing device application, to perform complex calculations to calculate range to a targeted object. In another example, the mobile computing device application can leverage a large, color data display, digital camera, a global positioning system (GPS) receiver, an accelerometer, a gyroscopic sensor, compass wireless radio, temperature/pressure sensor, ,altimeter, and/or other hardware provided by the mobile computing device to provide functionality not available with a conventional laser range finder (LRF). For example, instead of using a viewfinder to view an object through and to read range measurements from, a large color display can be leveraged to display easily readable data, provide a zoomed visual view of the object, and to provide simple-to-use user interface functions not possible with a viewfinder and external buttons. The digital camera can also provide functionality to record a range-finding session as still photo and/or video. GPS/compass data can also be inserted into displayed data for a user since it can be retrieved from a GPS receiver/compass. Fourth, the LRFA can be configured to provide attachment points for accessories such as tripods, handles, mounting brackets, protective covers, optical equipment, and/or the like. Other advantages will be apparent to those skilled in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

This disclosure generally describes methods and systems, including computer-implemented methods, computer-program products, and computer systems, for measuring distance/range to an object (e.g., range finding) by reflection of laser radiation. The following description is presented to enable any person skilled in the art to make, use, and/or practice the disclosed subject matter, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

Figure 1:
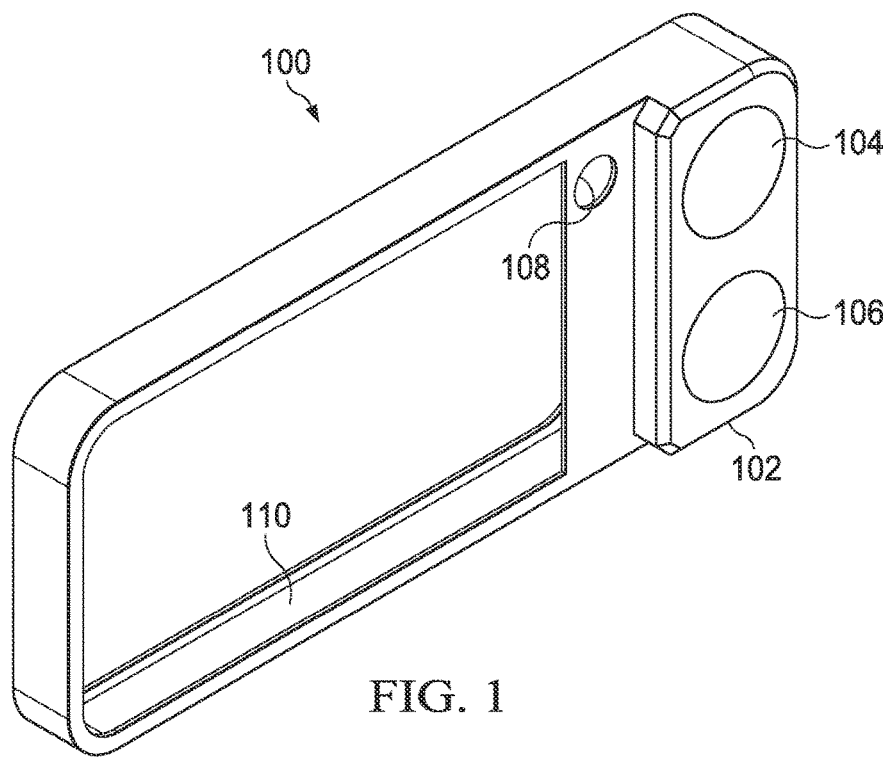
FIG. 1 is a front perspective view of an example laser range finding attachment (LRFA) according to an implementation.

FIG. 1 is a front perspective view of an example laser range finding accessory (LRFA) 100. The example LRFA 100 includes a housing 102 to allow attachment of a mobile computing device (e.g., a smart phone, PDA, tablet computer, etc.), an emitter 104, a receiver 106, an aperture 108, and a frame section 110. The housing 102 is configured to permit the mobile computing device to attach to the LRFA 100. For example, the mobile computing device can slide, snap-fit, sleeve, latch, and/or otherwise connect to the LRFA 100 (see FIG. 3). In some implementations, the housing 102 may be made of plastic or any other sufficiently rigid and strong material such as wood, metal, etc. Further, the various components of the housing 102, can be made of different materials.

The emitter 104 and the receiver 106 are situated within apertures in housing 102. Although not illustrated, in some implementations, the emitter 102 and receiver 104 can be combined into a single aperture. In some implementations, LRFA 100 can have two or more emitters 104 and/or receivers 106, each providing emission/receipt of different types of electromagnetic radiation.

The emitter 104 is typically a laser emitter emitting electromagnetic radiation at targeted object. The emitter 104 can be, among other things, a light emitting diode (LED), a super-luminescent diode (SLD), a solid, chemical, and/or gas laser, and/or multiple lasers or arrays of laser emitters covering different laser powers, frequencies, and/or optical properties. For example, an emitted laser (see FIG. 4) can be visible, invisible, and/or multi-frequency.

The receiver 106 is typically configured to focus returning electromagnetic radiation (e.g., reflected laser radiation) toward a detector (not illustrated) with the help of a lens assembly (not illustrated).

In some implementations, the emitter 104 and/or the receiver 106 includes a covering lens or other (e.g., coupled) device (not illustrated) to provide additional functionality and/or protection of the emitter 104. For example, the emitter 104 could be fitted with a focusing/diffusing lens and/or collimator to alter the electromagnetic radiation emission characteristics of the emitter 104. In this example, a collimator could narrow and align the output of the emitter 104 to produce a narrow, focused laser with which to illuminate a target object more precisely. In another example, a filtering lens could be used with the receiver 106 to filter all electromagnetic radiation but a particular type of reflected laser radiation (e.g., infrared, ultraviolet, microwave, etc.) emitted from the emitter 104. In this instance, filtering out unwanted/interfering electromagnetic radiation received at the receiver 106 can allow ranging of an object at a greater range.

In the example shown in FIG. 1, the housing 102 includes an aperture 108 positioned in such a manner to allow a digital camera (or in some implementations, digital cameras) of a mobile computing device attached to the LRFA 100 to view a target object. In other words, the aperture 108 can be located in a different part(s) of the housing than in the example of FIG. 1. In some implementations, the aperture does not include a lens. In other implementations, the aperture 108 includes a lens, for example, a magnification, filtering, and/or other type of lens proximate to the lens of the digital camera of an attached mobile computing device. The lens can be configured to transmit and/or influence/modify a particular type of image before receipt by a particular digital camera of the mobile computing device. In some implementations, in the case of multiple apertures 108, each aperture 108 can have a different lens for a particular purpose. For example, a first aperture 108 can have an optically clear lens zoom for an optical digital camera while a second aperture 108 can have a lens only permitting infrared electromagnetic radiation to reach a thermal camera (e.g., Germanium (Ge), quartz, AMTIER, barium fluoride, calcium fluoride, sodium chloride, CLEARTRAN, fused silica, silicon, polyethylene, IR transparent ceramics, and/or any other type of substance transparent to infrared electromagnetic radiation). In some implementations, two or more digital cameras can share a single aperture 108.

In some implementations, the LRFA 100 can be configured with one or more dedicated digital cameras (e.g., an optical and/or thermal type digital camera) (not illustrated) accessible by the mobile computing device. In some implementations, both a LRFA 100 digital camera and a mobile computing device digital camera can be used in conjunction with each other. For example, the LRFA 100 can include a thermal camera while the mobile computing device can include an optical camera. In other implementations, the housing 102 can be configured with data connectors (not illustrated) allowing attachment of an external digital camera or other devices.

The housing 102 also includes a frame section 110 providing a platform to attach the mobile computing device to the LRFA 100, for example, by pressing the mobile computing device within the frame section 110 of the housing 102. The frame section can surround/cover/support the mobile computing device in various degrees. For example, the frame section 110 can surround/cover/support the outer edge of the mobile computing device or can surround/cover/support the outer edge as well as the back of the mobile computing device. In another implementation the frame section 110 can wholly or partially surround/cover/support the outer edge. In other implementations, the shape and extent of coverage of the mobile computing device provided by the frame section 110 can vary. In some implementations, the frame section 110 can be adjustable such that the example attachment 110 can mate with a variety of mobile computing devices. For example, the frame section 110 can be flexible (e.g., rubber, flexible polymer, etc.) and/or include a sliding assembly (e.g., using slider bearings/rails) to allow translative extension of the frame section 110 to fit variously sized and shaped mobile computing devices. In some instances, the mobile computing device can attach to the example LRFA 100 with and/or without the frame section 110, for example, with friction, latches, fasteners, adhesives, clips, clamps, straps, and/or other attachment means (e.g., see FIGS. 7-11 described in more detail below).

Although not illustrated, the housing 102 can be configured to provide attachment points for accessories such as bipods, tripods, handles, mounting brackets, protective covers, optical/photographic equipment, and/or the like. Attachment points can include various structures such as threading, notches, holes, brackets, rails (e.g., picatinny, MIL-STD-1913, STANAG 2324, dovetail), etc.

Figure 2:
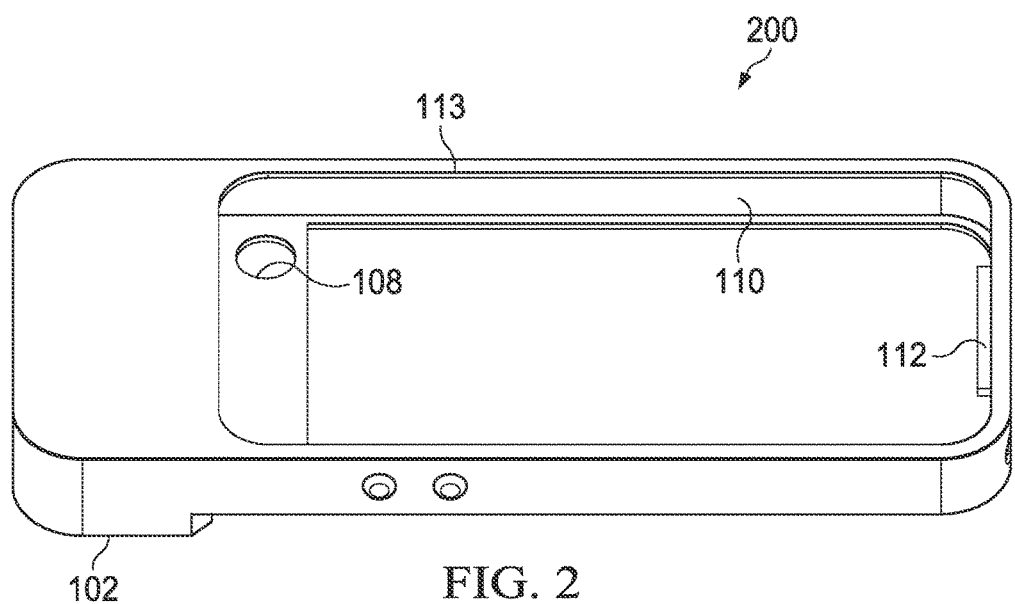
FIG. 2 is a rear perspective view of the example LRFA of FIG. 1 according to an implementation.

FIG. 2 is a rear perspective view 200 of the example LRFA 100 of FIG. 1 according to an implementation. Data connector 112 is configured as part of housing 102 to interface with a corresponding data port (e.g., USB, micro/mini USB, APPLE LIGHTNING, HDMI, serial, audio jack, etc.) of a mobile computing device. While the example of FIG. 2 illustrates the data connector 112 as configured on and protruding from the interior of frame section 110, the data connector 112 can be situated anywhere on the housing 102. In some implementations, a separate data cable (not illustrated) can be used to connect a data port of a mobile computing device with a data connector 112 situated on the exterior of housing 102. In some implementations, the data connector 112 can be a communications port for the mobile computing device such that data, commands, power, and/or other information can be transferred between the mobile computing device and the LRFA 100. In other implementations, the data connector 112 can be part of a wireless communication system configured into the LRFA 100 to communicate with the mobile computing device using wireless technology (e.g., 802.11x, BLUETOOTH, etc.). In other words, the LRFA 100 would not have a direct physical connection with the mobile computing device to transmit/receive data.

Illustrated flexible lip 113 is used as a retaining means to secure the mobile computing device within the housing 102. For example, the mobile computing device can be "snapped" into the housing 102 and the flexible lip 113 acts to prevent the mobile computing device from detaching from the housing 102. In other implementations, as described above with FIG. 1, the housing 102 can omit the lip 103 in lieu of other securing means.

Figure 3:
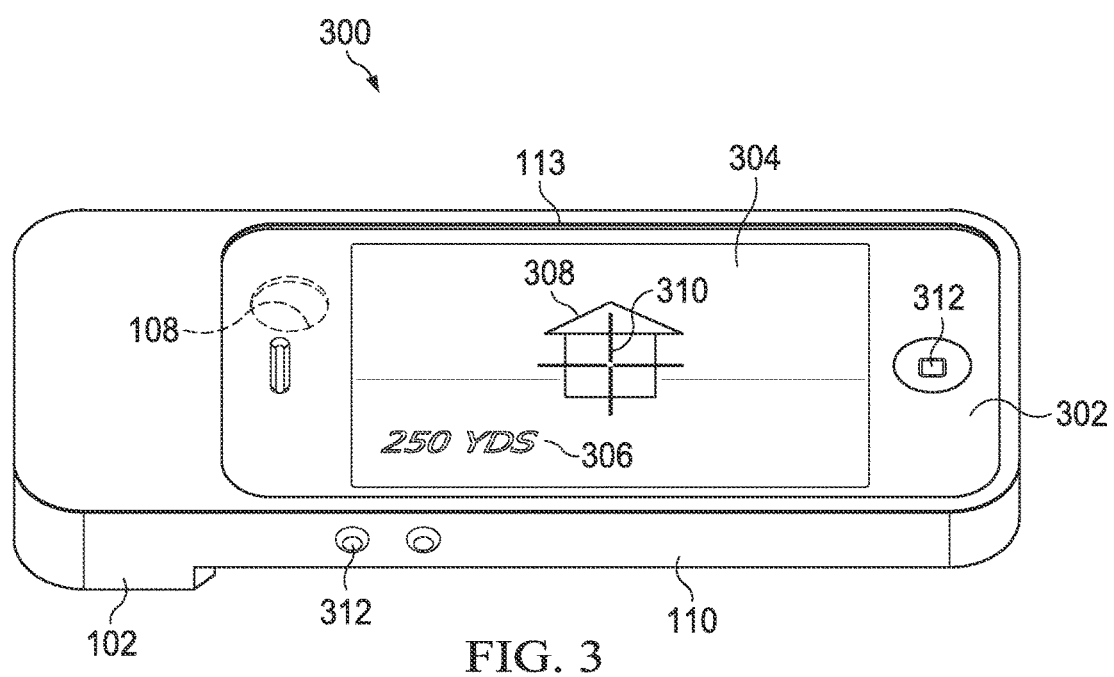
FIG. 3 is a perspective view of an example LRFA of FIGS. 1 and 2 coupled with a mobile computing device according to an implementation.

FIG. 3 is a perspective view 300 of an example LRFA 100 of FIGS. 1 and 2 coupled of with a mobile computing device according to an implementation. Mobile computing device 302 is situated within frame section 110 of the housing 102. In some implementations, data connector 112 (not illustrated) is physically coupled/engaged with a data port (not illustrated) associated with the mobile computing device 302. Flexible lip 113 assists in securing the mobile computing device 302 within housing 102. In some implementations, the data connector 112 also provides a structural support to help secure the mobile computing device 302 within the housing 102. A digital camera (not illustrated) on a rear side of the mobile computing device 302 is adjacent to the aperture 108 (illustrated with a dashed line) on the housing 102.

The mobile computing device 302, for example, a mobile smartphone such as an APPLE IPHONE, ANDROID phone, WINDOWS phone, etc., includes a display 304 providing a graphical user interface (GUI) 306 for a user to interact with the LRFA 100. In some implementations, the display is a touch screen display interfaced with using fingers, styluses, etc.

In some implementations, the mobile computing device 302 digital camera can be directed at an object 308 using a crosshair/reticle 310 generated by a mobile computing device application to permit centering/targeting of the object 308. The object 308 can be ranged by using the application to activate the emitter 104, for example using the GUI 306, a mobile device button 312, or with some other appropriate means. A range to the object 308 can be display on the GUI 306 (e.g., "250 YDS"). In some implementations, other data can be calculated/displayed on the GUI 306, for example, GPS coordinates of the LRFA 100 and/or object 308, a ballistic solution from the LRFA 100 to the object 308, a compass bearing to the object 308, inclination of the object 308, digital zoom setting, and the like.

In some implementations, the mobile computing device 302 application can be used to record still images and/or video of the object 308 (and the surrounding area) and/or the GUI 306 for record keeping, evidence, law enforcement, and the like. The application can also be used to output maps ranges to measured objects, transmit ranging and/or other data by telephone, Internet, BLUETOOTH, WI-FI, and/or other means.

Figure 4:
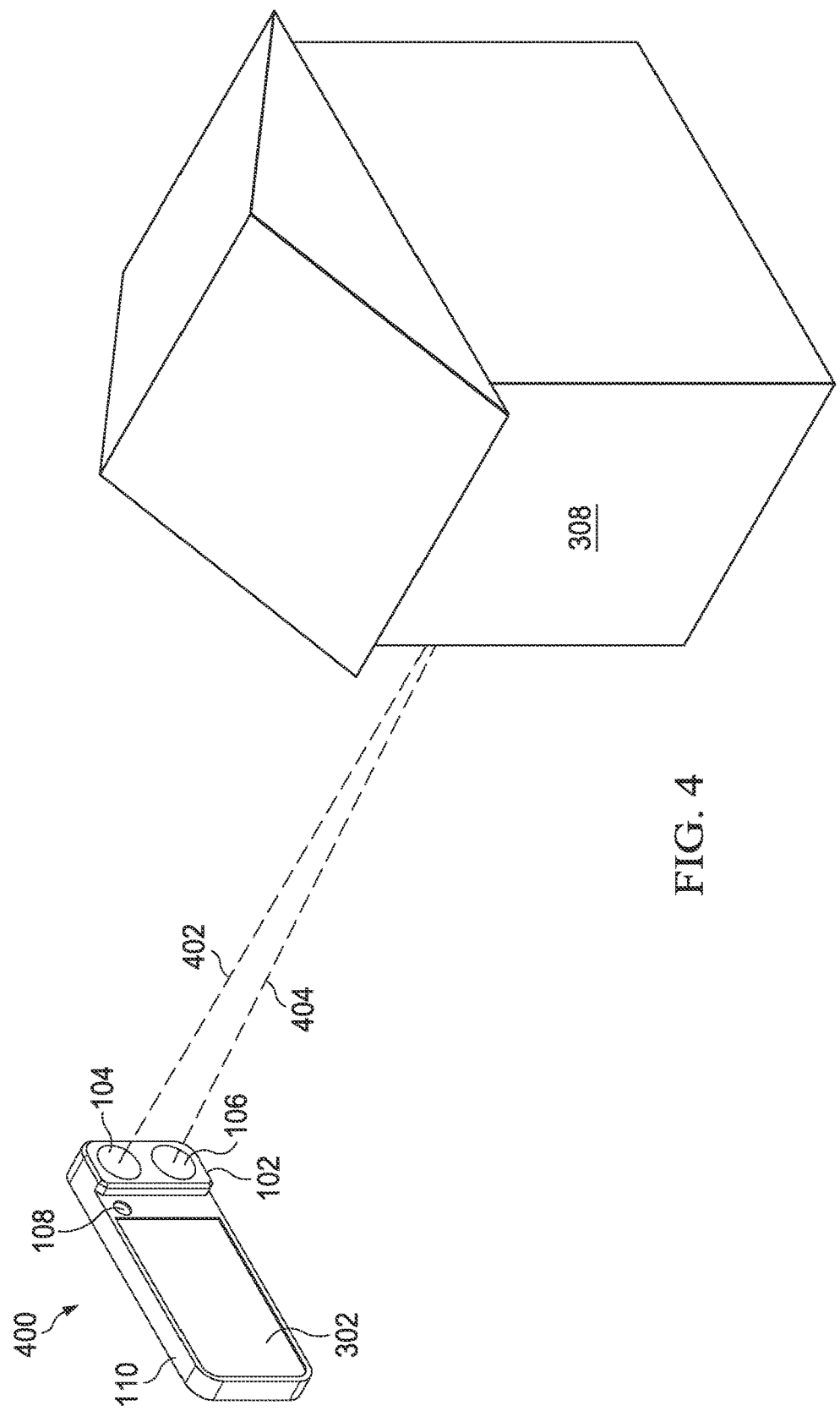
FIG. 4 is a perspective view of the LRFA and mobile computing device of FIG. 3 targeting an object according to an implementation.

FIG. 4 is a perspective view 400 of the LRFA 100 and mobile computing device of FIG. 3 targeting an object 308 according to an implementation. The object 308 can be any physical material, surface, or object (e.g., a building, landform, tree, person, vehicle, etc.). Object 308 of FIGS. 3 and 4 is illustrated as a building. In some implementations, a command is sent from an application executing on the mobile computing device 302 to the emitter 104 of the LRFA 100 to emit a laser 402. The laser 402 strikes and reflects from the object 308. A reflected portion 404 of the laser 402 is directed back toward the receiver 106 where it is received. In some implementations, the application compares the time difference between the emission of the laser 402 and the receipt of the reflected portion 404 to determine a corresponding time delta used to calculate a range between the LRFA 100 and the object 308. As will be appreciated by those of ordinary skill in the art, in some implementations, other methods/types of calculation can also be performed to determine the range between the LRFA 100 and the object 308. As shown in FIG. 3, a visual identification of the range to the object 308 can be displayed on the display 304 on GUI 306 (e.g., "250 YDS"). In some implementations, a time variable feature may be implemented in the mobile computing device 302 so that sensitivity for signals from a closer location is greater than for those from a remote location. For example, numerical data returned to the mobile computing device 302 can be more precise to allow for more precise calculations (e.g., more decimal places, etc.).

Figure 5:
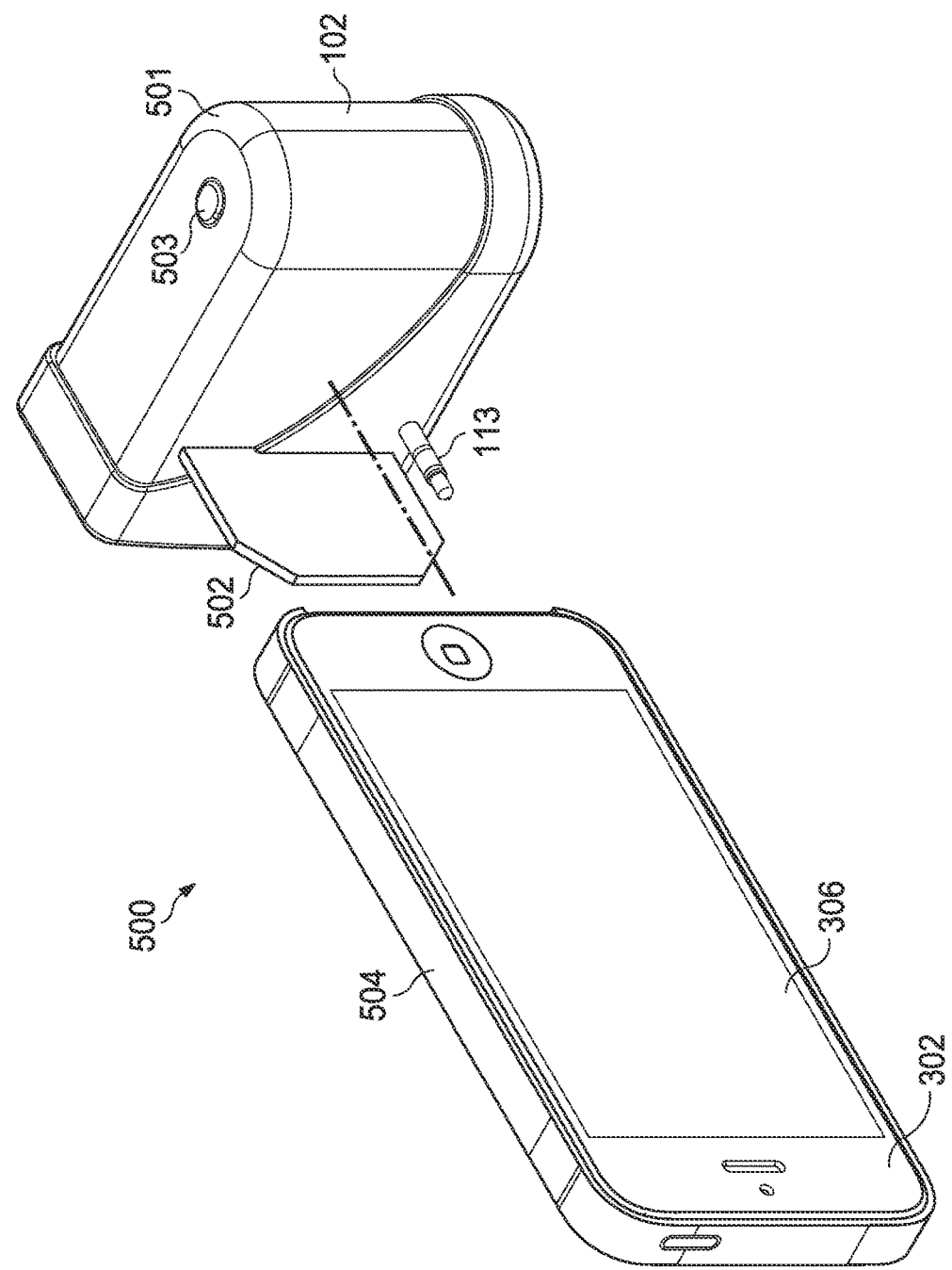
FIG. 5 illustrates a perspective view of a stand-alone LRFA according to an implementation.

FIG. 5 illustrates a perspective view 500 of a stand-alone LRFA 501 according to an implementation. In this embodiment, the LRFA 501 can be separated from the mobile computing device 302. In some implementations, the LRFA 501 couples with case 504 attached to the mobile computing device 302 using locking tab 502 and/or data connector 112. In other implementations, case 504 is optional. The data connector 112 is inserted into a data port of the mobile computing device 302 to permit data to be transferred between the LRFA 501 and the mobile computing device 302. As with the implementation described in FIG. 104, data connector 112 can be a component of a non-physical connection (e.g., wireless, etc.) between the LRFA 501 and the mobile computing device. In some implementations, power switch 503 can be used to power ON/OFF the LRFA 501.

Figure 6:
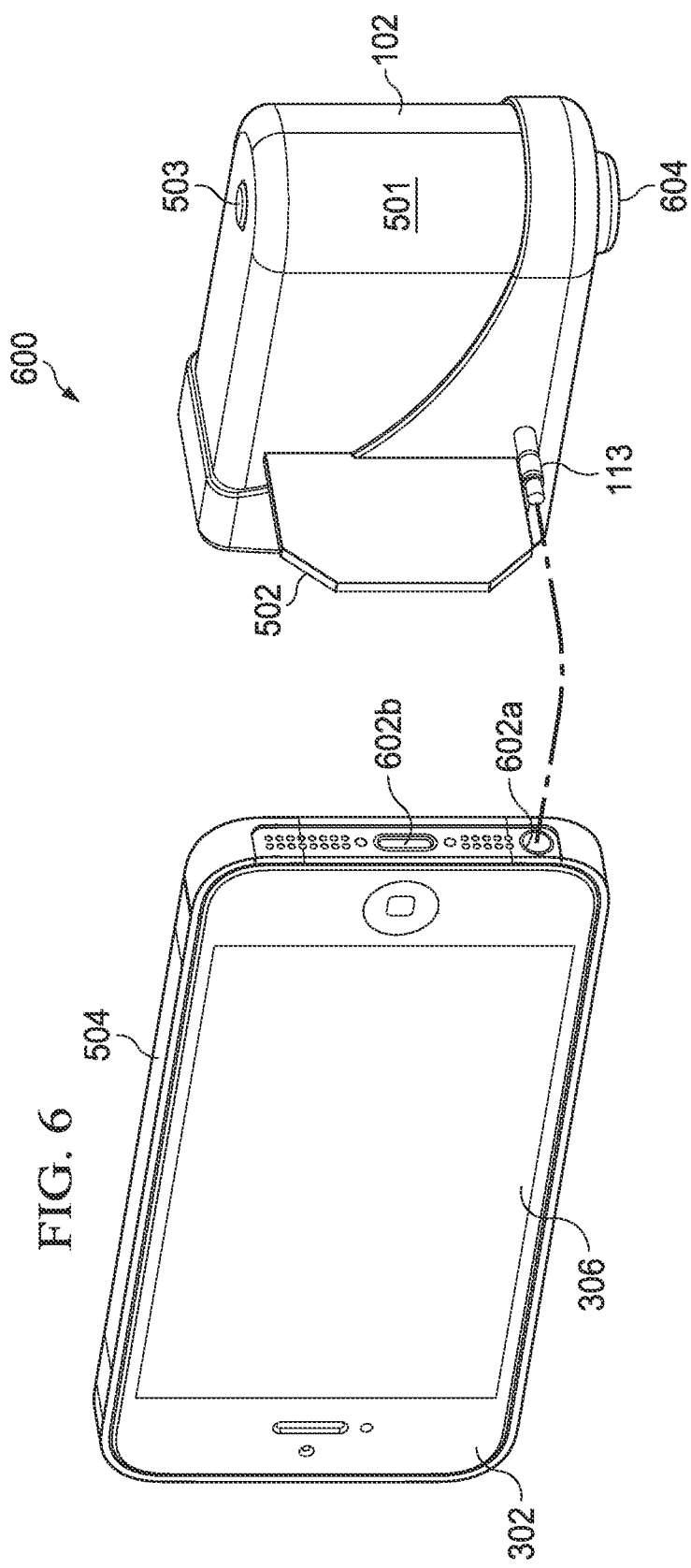
FIG. 6 is an alternate perspective view of the stand-alone LRFA of FIG. 5 according to an implementation.

FIG. 6 is an alternate perspective view 600 of the stand-alone LRFA 501 of FIG. 5 according to an implementation. Data ports 602a and 602b are illustrated. Although illustrated as only configured with one data connector 112 using data port 602a, in some implementations, LRFA 501 can be configured with multiple data connectors and use two or more data ports (e.g., both 602a and 602b) singly or simultaneously. In some implementations, battery compartment 604 can be used to insert/replace one or more batteries to provide power to the LRFA 501.

Figure 7:
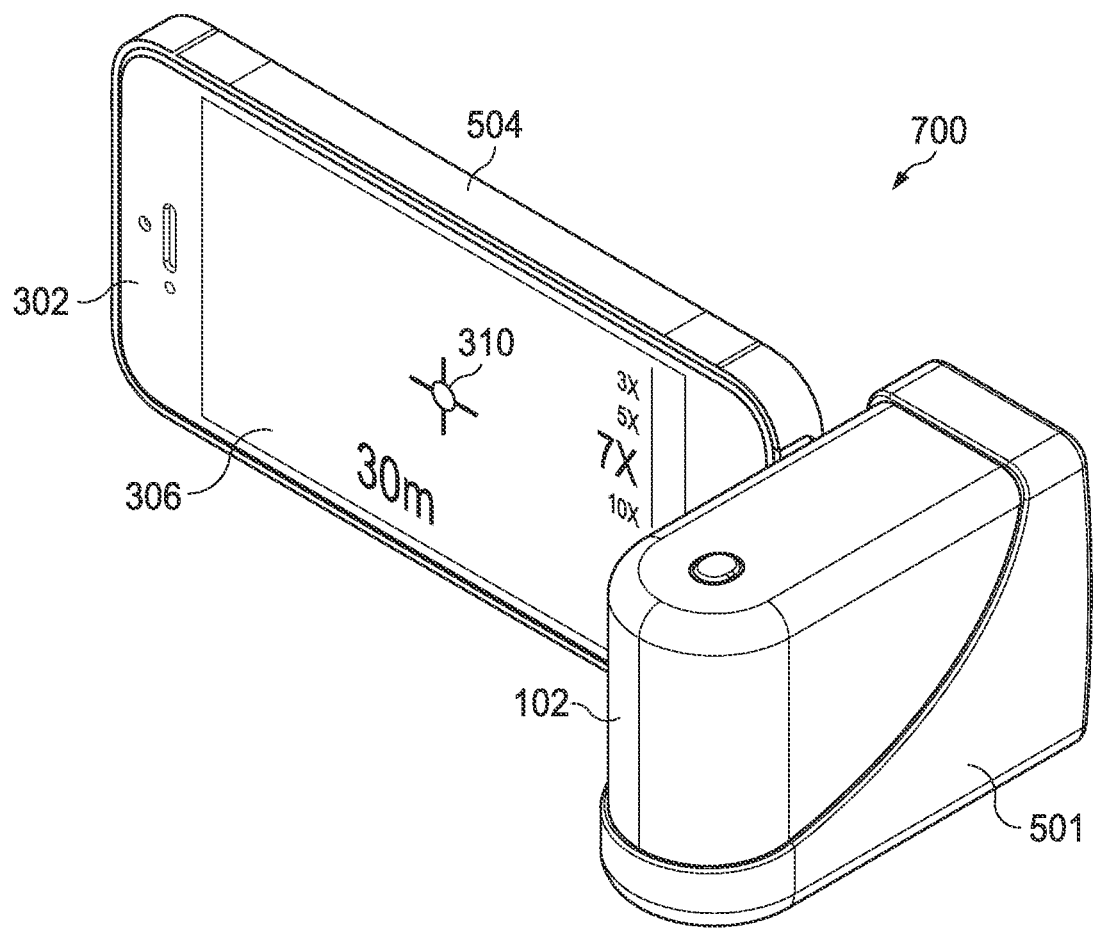
FIG. 7 illustrates a coupled view of the stand-alone LRFA of FIGS. 5 and 6 and a mobile computing device according to an implementation.

FIG. 7 illustrates a coupled view 700 of the stand-alone LRFA 501 of FIGS. 5 and 6 and a mobile computing device 302 according to an implementation. Note that in this implementation, case 504 is used to help couple LRFA 501 and the mobile computing device 302 (see FIG. 8 for additional detail).

Figure 8:
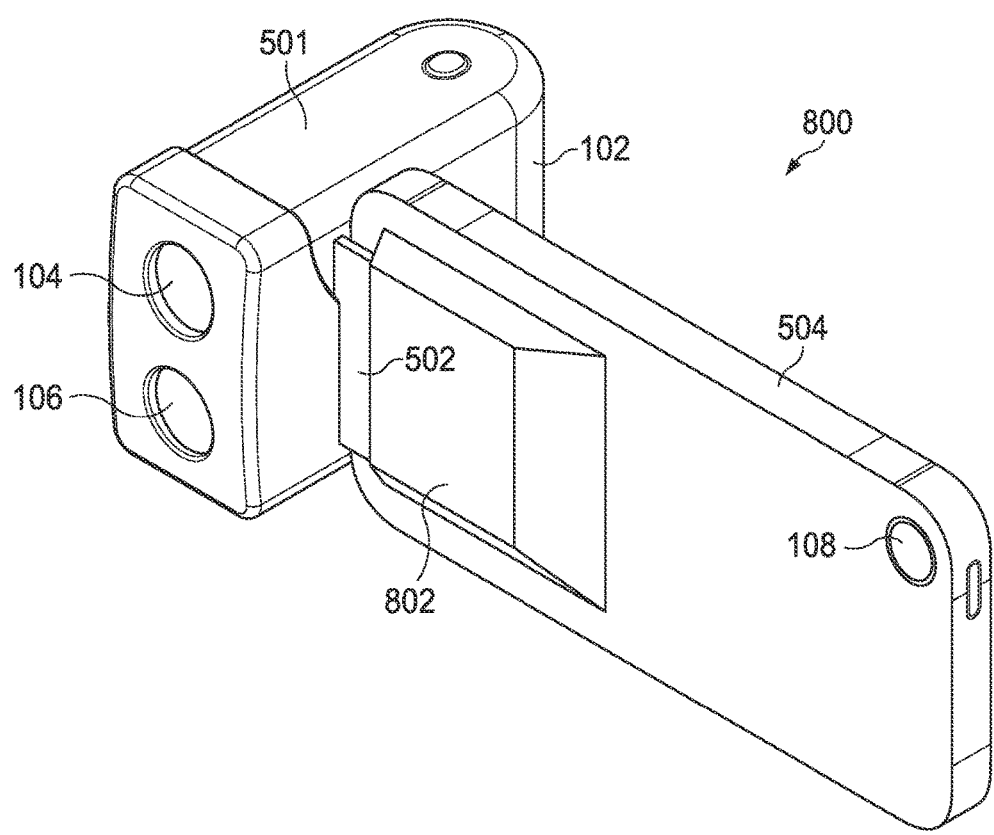
FIG. 8 is a front perspective view of the stand-alone LRFA coupled to a mobile computing device according to an implementation.

FIG. 8 is a front perspective view 800 of the stand-alone LRFA 501 coupled to a mobile computing device 302 according to an implementation. As illustrated and similar to the LRFA 100 of FIGS. 1-5, the housing 102 of the stand-alone LRFA 501 is configured with an emitter 104 and a receiver 106. As described above, the emitter 104 and the receiver 106 can, in some implementations, be combined into a single aperture. Locking tab 502 is inserted into a locking slot 802 in case 504. The combination of locking tab 502 and locking slot 802 provides structural support to prevent bending and/or torqueing of the LRFA 501 and the mobile computing device 302. In some implementations, the coupling of the data connector 112 and the data port 602 (in this example data port 602a), can also provide structural support as described. In some implementations, the locking tab 502 can be configured with a ridge or other structure to snap and lock into the locking slot 802 to make it more difficult to remove the LRFA 501 from the mobile computing device. In implementations without case 504, the locking tab can provide structural support by resting against the mobile computing device 302 or a general protective case used to protect the mobile computing device 302.

Figure 9:
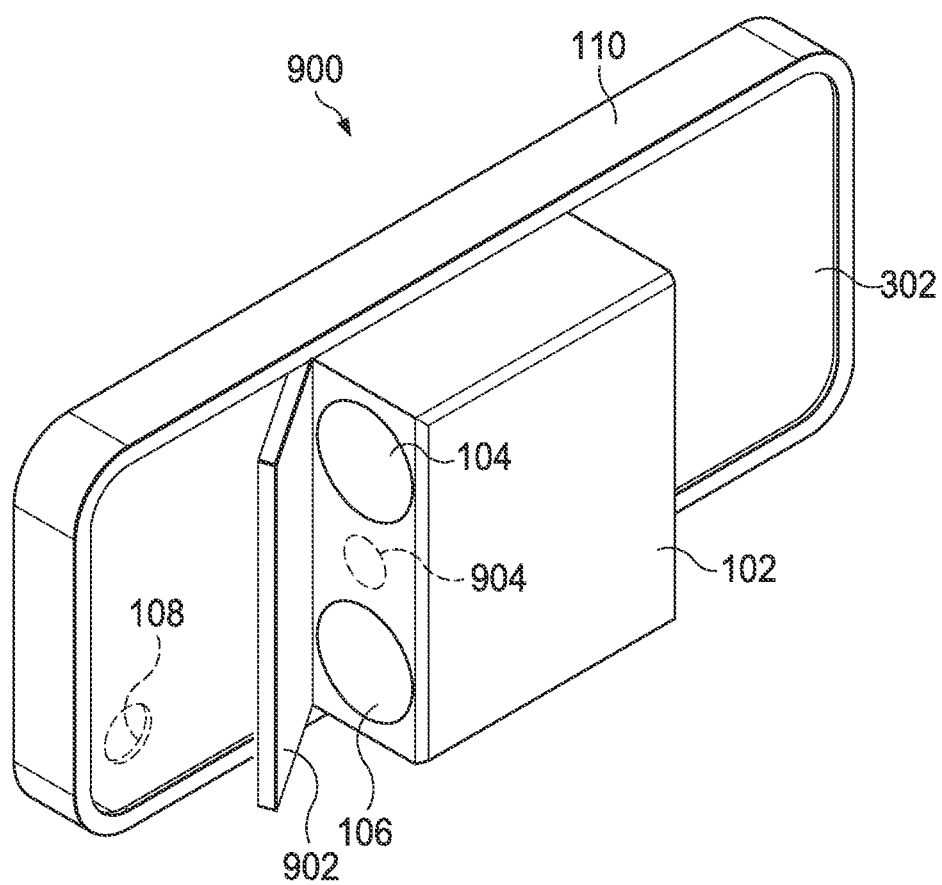
FIG. 9 is a perspective view of an LRFA configured with a mirror according to an implementation.

FIG. 9 is a perspective view of an LRFA 900 configured with a mirror according to an implementation. LRFA 900 is configured with a mirror assembly 902 to direct electromagnetic radiation from the emitter 104 to an object 308 (not illustrated) at an angle to the emission direction (e.g., ninety degrees) and to reflect received a reflected portion of the emitted electromagnetic radiation into the receiver 106 (e.g., ninety degrees from the angle of receipt).

In the illustrated embodiment of FIG. 9, emitter 104 and receiver 106 are angled to point in a direction (e.g., toward the top or bottom of the mobile computing device) parallel to a plane formed by the mobile computing device and housing 102. In some implementations, a portion of the housing 102 containing the emitter 104 and/or the receiver 106 can be configured with a rotational mechanism to allow rotation of the portion of the housing around an axis perpendicular to the plane formed by the mobile computing device. In these implementations, rotation can be delineated by a detent providing auditory/tactile feedback and set rotational gradations. As an example, when the Sun is directly overhead, it might be useful to be able to rotate the emitter 104 and receiver 106 apertures to point toward the ground to minimize sunlight that may enter apertures if otherwise pointed skyward. In some implementations, the angle of the mirror can be adjustable. A hinge or other structure can allow movement and/or locking of the orientation of the mirror 902. For example, if a LRFA 900 is mounted on a tripod on uneven ground, the mirror 902 can be angled to permit a compensation for inclination of the LRWA 900 in relation to a target object (e.g., object 308). In some implementations, the mirror 902 can be folded over the emitter 104 and receiver 106 to provide storage/protection for the mirror and/or a protective cover for the emitter 104 and receiver 106. In some implementations, an application executing on the mobile computing device can permit a user to properly angle the mirror to target an object (e.g., object 308). For example, an optional digital camera 904 apart from digital camera 108 could be configured between the emitter 104 and receiver 106 to provide targeting functionality in light of sight with the emitter 104 and receiver 106.

Figure 10:
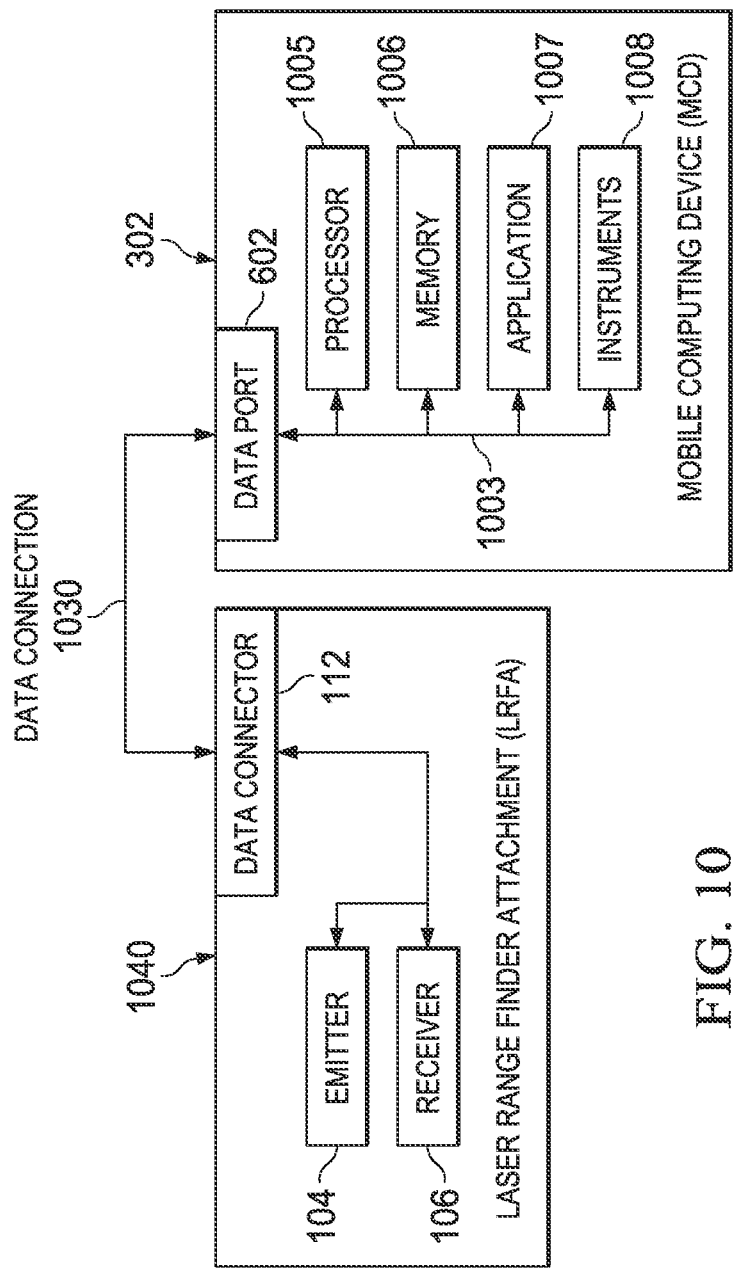
FIG. 10 is a block diagram illustrating components of an example LRFA according to an implementation.

FIG. 10 is a block diagram illustrating components of an example LRFA system 1000 according to an implementation. The illustrated LRFA system 1000 includes or is communicably coupled with a mobile computing device (MCD) 302 and an LRFA 1040 that communicate across a data connection 1030. In some implementations, one or more components of the LRFA system 1000 may be configured to operate in conjunction with other mobile computing devices and/or LRFAs.

At a high level, the MCD 302 is an electronic computing device operable to receive, transmit process, store, manage, and/or display data and information associated with the LRFA system 1000. The MCD 302 is typically a mobile communication device such as a mobile telephone, tablet computer, PDA, or similar, but can also encompass any computing device such as a desktop computer/server, laptop/notebook computer, one or more processors within these devices, or any other suitable processing device.

The MCD 302 is responsible for generating requests and/or receiving, among other things, data from an LRFA 1040 and responding to the received data. In some implementations, the MCD 302 processes the data using an application 1008. In addition to requests sent to and/or received from the LRFA 1040, requests may also be sent to and/or received from other MCDs 302 and/or LRFAs 1040. For example, one MCD 302 can be designated as a "controller" and received data from multiple LRFAs 1040 to more accurately determine range calculations to a targeted object (e.g., object 308) and range calculation values from multiple perspectives.

Each of the components of the MCD 302 can communicate using a system bus 1003. In some implementations, any and/or all the components of the MCD 302, both hardware and/or software, may interface with each other and/or the data port 602 over the system bus 1003 using an application programming interface (API), service layer, or the like (not illustrated). The API may include specifications for routines, data structures, and object classes. The API may be either computer-language independent or dependent and refer to a complete interface, a single function, or even a set of APIs. The service layer provides software services to the LRFA system 1000. The functionality of the MCD 302 may be accessible for all service consumers using this service layer. Software services, such as those provided by the service layer, provide reusable, defined business functionalities through a defined interface. For example, the interface may be software written in JAVA, C++, or other suitable language providing data in extensible markup language (XML) format or other suitable format. Any or all parts of the API and/or the service layer may be implemented as child or sub-modules of another software module without departing from the scope of this disclosure. For example, the API 112 could be integrated into the application 1008.

The MCD 302 includes a data port 602. Although illustrated as a single data port 602 in FIG. 1, two or more data ports 602 may be used according to particular needs, desires, or particular implementations of the LRFA system 1000. The data port 602 is used by the MCD 302 for communicating with the LRFA 1040 and/or other MCDs 302/LRFAs 1040 connected to the data connection 1030. Generally, the data port 602 comprises logic encoded in software and/or hardware in a suitable combination and operable to communicate with the data connection 1030. More specifically, the data port 602 may comprise software supporting one or more communication protocols associated with communications such that the data connection 1030 or data connection 1030 hardware is operable to communicate physical signals within and outside of the illustrated LRFA system 1000. The data connection can include a wireless network (e.g., cellular, WIFI, BLUETOOTH, etc.) and/or direct physical connection (e.g., cable, etc.)

The MCD 302 includes a processor 1005. Although illustrated as a single processor 1005 in FIG. 1, two or more processors may be used according to particular needs, desires, or particular implementations of the LRFA system 1000. Generally, the processor 1005 executes instructions and manipulates data to perform the operations of the MCD 302. Specifically, the processor 1005 executes the functionality required for measuring distance/range to an object (e.g., range finding) by reflection of laser radiation.

The MCD 302 also includes a memory 1006 that holds data for the MCD 302 and/or LRFA 1040. Although illustrated as a single memory 1006 in FIG. 10, two or more memories may be used according to particular needs, desires, or particular implementations of the LRFA system 1000. While memory 1006 is illustrated as an integral component of the MCD 302, in alternative implementations, memory 1006 can be external to the MCD 302 and/or the LRFA system 1000. In some implementations, memory 1006 can be configured to store one or more instances of user profiles, target object data, recorded ranging data, applications, and/or other appropriate data.

The application 1007 is a software calculation engine providing, among other things, functionality related to measuring distance/range to an object (e.g., range finding) by reflection of laser radiation (including functionality described above). The application 1007 also allows for configuration of the MCD 302, generating and initiating display of GUI layouts on an associated display, receiving and processing user input, performing complex calculations related to range determination, triggering emission of laser radiation (e.g., laser 402), and receiving data pertaining to a reflected portion of laser radiation received at the emitter 106. In some implementations, GUI layouts generated by the application 1007 are displayed in a web-based (e.g., HTML-type format) and/or custom application format.

Although illustrated as a single application 1007, the application 1007 may be implemented as multiple applications 1007. In addition, although illustrated as integral to the MCD 302, in alternative implementations, the application 1007 can be external to the MCD 302 and/or the LRFA system 1000 (e.g., wholly or partially executing on a different implementation of the LRFA 1040, other MCD 302 (not illustrated), etc.).

Instruments 1008 can include various hardware and/or software instruments to collect data to make available to the application 1007. For example, in some implementations, instruments 1008 can include a data display, digital camera, a global positioning system (GPS) receiver, an accelerometer, a gyroscopic sensor, compass, wireless radio, temperature/pressure sensor, altimeter, and/or other instrument suitable for the purposes of the LRFA system 1000.

The LRFA 1040 generally represents the LRFA implementations describe above (e.g., LRFA 100, 500, 900, as well as other possible implementations). In some implementations, the LRFA 1040 includes one or more emitters 104, receivers 106, and data connectors 112 as described above. As will be apparent to those of ordinary skill in the art, LRFA 1040 can also contain necessary unillustrated control/processing circuitry, and/or other components to permit the above-described functionality/operation. As described above, there may be any number of LRFAs 1040 associated with, or the LRFA system 1000.

In other implementations, the LRFA 1040 can be separately configured with a digital camera, processor, LRFA application, memory, and/or LRFA instruments (e.g., similar to those associated with the MCD 302). In these implementations, for example, the LRFA 1040, could be an intelligent/semi-intelligent component of the LRFA 1000 system (e.g., performing configuration of the LRFA 1040, performing complex calculations using the LRFA application and transmitting the results (including GUI and/or other data) to the MCD 302 using the data connector 112, obtaining images using the digital camera, triggering the emitter 104, etc.

Figure 11:
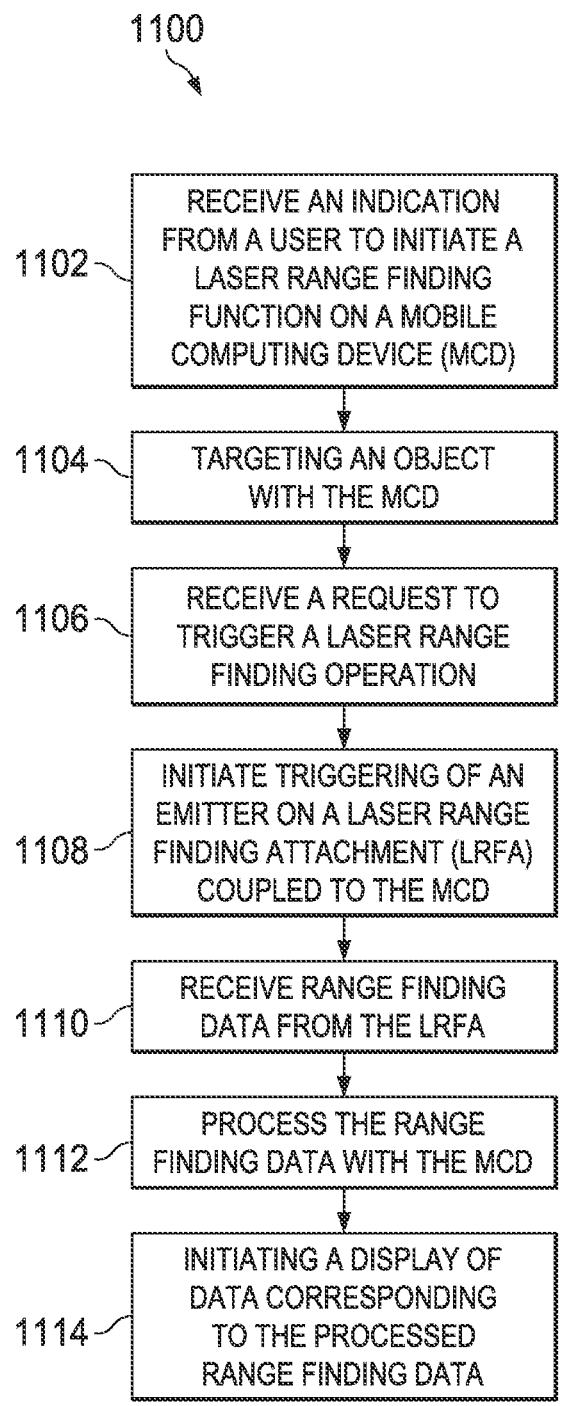
FIG. 11 is a flow chart illustrating a method for measuring range to an object by reflection of laser radiation according to an implementation.

FIG. 11 is a flow chart illustrating a method 1100 for measuring range to an object by reflection of laser radiation according to an implementation. For clarity of presentation, the description that follows generally describes method 1100 in the context of FIGS. 1-10. However, it will be understood that method 1100 may be performed, for example, by any other suitable system, environment, software, and hardware, or a combination of systems, environments, software, and hardware as appropriate. In some implementations, various steps of method 1100 can be run in parallel, in combination, in loops, or in any order.

At 1102, an indication is received from a user to initiate a laser range finding function on a MCD coupled with a LRFA. For example, the user can open an application on the MCD providing laser range finding functionality. From 1102, method 1100 proceeds to 1104.

At 1104, the user targets an object with the MCD. For example, the display of the MCD can display a reticle on a graphical user interface to target/center the object. In some implementations, the MCD graphical user interface can provide other functionality/data useful in targeting the object. For example, zoom functionality, ability to select different reticle forms, object identification, GPS coordinates of the user and/or targeted object, compass bearing, etc. From 1104, method 1100 proceeds to 1106.

At 1106, a request to trigger a laser range finding operation is received. For example the user can select an element of the MCD graphical user interface and/or a button on the MCD to trigger a laser range finding operation. From 1106, method 1100 proceeds to 1108.

At 1108, the MCD initiates triggering of an emitter on the LRFA coupled to the MCD. In some implementations, the MCD sends a signal/data to the emitter and/or control circuitry on the LRFA to trigger the emitter to emit laser radiation at the object. From 1108, method 1100 proceeds to 1110.

At 1110, the MCD receives range finding data from a receiver on the LRFA. The receiver generates the range finding data from received reflected laser radiation from the object. From 1110, method 1100 proceeds to 1112.

At 1112, the MCD processes the received range finding data. From 1112, method 1100 proceeds to 1114.

At 1114, the MCD initiates a display of data corresponding to the processed range finding data. For example, the MCD can initiate display of a range measurement to the object, global positioning system (GPS) related data of the position of the LRFA and/or the object, a ballistic solution from the LRFA to the object, and/or other data. After 1114, method 1100 stops.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a PDA, a mobile audio or video player, a game console, a GPS receiver, or a portable storage device, e.g., a USB flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A system, comprising:
a detachable laser range finding attachment (LRFA) comprising:

an emitter and a receiver situated within a housing, the emitter and receiver configured to emit and receive, respectively, laser radiation and reflected laser radiation; and a data connector situated on the housing; and a mobile computing device (MCD) engaged within the housing of the LRFA, wherein the housing of the LRFA is configured to physically couple the MCD and the LRFA and to retain the MCD within the LRFA housing with a flexible lip, wherein the MCD is configured to provide at least viewfinder functionality on a graphical user interface (GUI) to permit targeting of an object with the emitted laser radiation, and wherein an emission axis and a receiving axis of the emitter and receiver, respectively, are oriented perpendicularly to a plane formed by the GUI of the MCD.

2. The system of claim 1, wherein the viewfinder functionality is configured to provide a reticle to target the object.

3. The system of claim 1, wherein the LRFA comprises an aperture in the housing configured to allow a camera of the MCD to view the object.

4. The system of claim 3, wherein the aperture comprises a lens.

5. The system of claim 1, wherein the data connector of the LRFA is configured to communicably couple with a data port of the MCD.

6. The system of claim 1, comprising a case for the MCD configured to couple with the LRFA.

7. The system of claim 1, wherein the housing comprises a frame section configured to support the MCD.

8. The system of claim 1, comprising a mirror, wherein the mirror directs the laser radiation from and the reflected laser radiation to the emitter and receiver, respectively.

9. The system of claim 8, wherein the mirror is adjustable.

10. The system of claim 1, wherein the housing is configured to rotate around an axis perpendicular to a plane formed by the MCD.

11. A method, comprising:
the following operations executed on a mobile computing device (MCD):
targeting an object with an MCD display operating as a viewfinder;
receiving an indication on the MCD to trigger a laser range finding operation;
initiating triggering of a laser radiation emitter on a detachable laser range finding attachment (LRFA) physically coupled to the MCD, wherein a housing of the LRFA is configured to physically couple the MCD and the LRFA and to retain the MCD within the LRFA housing with a flexible lip, and wherein an emission axis and a receiving axis of the laser radiation emitter and a corresponding laser radiation receiver for receiving reflected laser radiation, respectively, are oriented perpendicularly to a plane formed by the MCD display;
receiving range finding data from the LRFA;
processing the range finding data; and
initiating display of data associated with the object, the data corresponding to the processed range finding data.

12. The method of claim 11, comprising receiving an indication from a user to initiate a laser range finding function.

13. The method of claim 11, wherein the display depicts a reticle for targeting the object.

14. The method of claim 11, wherein the request is received by a graphical user interface associated with the MCD.

15. The method of claim 11, wherein the data is at least one of a range measurement, global positioning system (GPS) related data, or ballistic solution.

16. A non-transitory, computer-readable medium storing computer-readable instructions executable by a computer and operable to:
target an object with a mobile computing device (MCD) display operating as a viewfinder;
receive an indication on the MCD to trigger a laser range finding operation;
initiate triggering of a laser radiation emitter on a detachable laser range finding attachment (LRFA) physically coupled to the MCD, wherein a housing of the LRFA is configured to physically couple the MCD and the LRFA and to retain the MCD within the LRFA housing with a flexible lip, and wherein an emission axis and a receiving axis of the laser radiation emitter and a corresponding laser radiation receiver for receiving reflected laser radiation, respectively, are oriented perpendicularly to a plane formed by the MCD display;
receive range finding data from the LRFA;
process the range finding data; and
initiate display of data associated with the object, the data corresponding to the processed range finding data.

17. The medium of claim 16, comprising receiving an indication from a user to initiate a laser range finding function.

18. The medium of claim 16, wherein the display depicts a reticle for targeting the object.

19. The medium of claim 16, wherein the request is received by a graphical user interface associated with the MCD.

20. The medium of claim 16, wherein the data is at least one of a range measurement, global positioning system (GPS) related data, or ballistic solution.

* * * * *